United States Patent [19]

Payne

[11] 4,451,388

[45] May 29, 1984

[54] PREPARATION OF ALUMINUM OXIDE COATED SILICA SOLS USING ULTRAFILTRATION

[75] Inventor: Charles C. Payne, Chicago, Ill.

[73] Assignee: Nalco Chemical Company, Oak Brook, Ill.

[21] Appl. No.: 317,041

[22] Filed: Nov. 2, 1981

[51] Int. Cl.$^3$ .............................................. B01J 13/00
[52] U.S. Cl. ................................................ 252/313 S
[58] Field of Search ..................................... 252/313 S

[56] References Cited

U.S. PATENT DOCUMENTS 3,560,400 2/1971 Chilton ............................ 252/313 S
3,864,142 2/1975 Kovarils .......................... 252/313 S
3,969,266 7/1976 Iler ................................... 252/313 S

FOREIGN PATENT DOCUMENTS 292414 11/1964 Australia .

Primary Examiner—Benjamin R. Padgett
Assistant Examiner—Anne Brookes
Attorney, Agent, or Firm—John G. Premo; Robert A. Miller; Donald G. Epple

[57] ABSTRACT

New alumina coated silica sols are produced by a method which comprises mixing a concentrated deionized silica sol with concentrated solutions of trivalent acid aluminum salts, heating this premix to at least 90° C. for 1–15 minutes to form an alumina reacted silica sol solution, cooling this reacted silica sol solution to form a cooled alumina reacted silica sol solution, diluting with deionized water to about 10 weight percent solids, exposing this diluted alumina reacted silica sol to ultrafiltration through a membrane having a molecular weight cutoff of about 30,000, adding distilled or deionized water to the diluted alumina reacted silica sol during ultrafiltration to wash dissolved salts from this salt solution forming a diluted alumina-coated silica sol having a pH between about 4–5 and a conductivity between about 2,000–4,000 micromhos, concentrating this dilute alumina-coated silica sol to at least 30 weight percent solids, thereby obtaining a stable alumina-coated silica sol.

5 Claims, No Drawings

PREPARATION OF ALUMINUM OXIDE COATED SILICA SOLS USING ULTRAFILTRATION

INTRODUCTION

This invention relates to hydrous aluminum oxide sols. Specifically, the invention is directed to hydrous alumina sols which have properties and characteristics which are different from conventional hydrous alumina sols. The invention further relates to hydrous alumina sols which are formed about a core of silica of colloidal dimension. The invention is also concerned with a method of producing new and useful hydrous alumina coated silica sols from trivalent aluminum salts.

Hydrous metal oxide sols have been well known for many years. An early treatise describing in detail the hydrous oxide sols, as well as conventional preparative techniques for synthesizing these materials, is "The Hydrous Oxides," by H. Wieser (McGraw-Hill), 1926. A convenient method for preparing hydrous metal oxide sols is described in Ryznar, U.S. Pat. No. 2,438,230. In this patent, it is suggested that a colloidal aqueous sol of a hydrous metal oxide may be produced by passing a dilute solution of an appropriate metal salt through the base form of a weak base anion exchange resin. The simplicity of this manufacturing technique allows relatively pure hydrous metal oxide sols to be produced. One of the disadvantages of preparing sols by using the ion exchange method is that the finished products are quite dilute and require further processing before a practical concentration may be obtained. The hydrous metal oxide sols made by prior art methods when concentrated above 10 weight percent are generally quite various that further concentration is impractical.

In U.S. Pat. No. 2,560,707, the alumina sols described are said to have a maximum practical concentration of about 10% by weight.

U.S. Pat. No. 3,139,406 issued to Mindick, et al, teaches a method of producing a hydrous metal oxide sol. The method taught is best summarized by reading claim 1 of U.S. Pat. No. 3,139,406, which is as follows:

"The method of producing a hydrous metal oxide sol which comprises dissolving a trivalent acidic metal salt, having a monovalent anion and being capable of forming an insoluble hydrous oxide with water, into a hydrophilic colloidal silica sol having a silica concentration within the range of 3-50% $SiO_2$, contacting said solution with a water insoluble anion exchange resin which has its exchangeable anion an anion of a weak volatile inorganic acid, removing said anion exchange resin when the pH of the solution has not risen more than 2.0 pH units, heating said solution to a temperature of at least 180° F. to about the boiling point of water for at least 15 minutes, contacting said heated solution with a water insoluble anion exchange resin which has as its exchangeable anion an anion of a weak volatile inorganic acid, removing said resin from said solution when the pH has risen not more than 1.5 pH units, heating said solution to at least 180° F. to at about the boiling point of water for at least 15 minutes under conditions tending to prohibit the evaporation of said hydrophilic liquid, and then adjusting the pH of the finished product to at least 2.0 pH units above the pH of the starting trivalent acidic salt solution, with the quantity of acidic metal salt used in relation to the colloidal silica being at least the amount, calculated as $Al_2O_3$, represented by Curve B in the drawing."

Curve B is a complex curvilinear representation in a drawing presented in this patent.

As one easily understands, this method is quite laborious and complicated with many available pitfalls. It is particularly expensive due to large amounts of time being needed to complete the synthesis.

U.S. Pat. No. 2,733,205, issued to Dalton, et al, teaches a process for abstracting anions from alumina sols. Again, this process is based on anion exchange technology but uses carbon dioxide and pH control to obtain the alumina particles in sol form. Although the last two reference patents teach the formation of alumina sols, and/or alumina coated sols in what appears to be commercial concentrations, these products are obtained by complex manufacturing methods and are fairly expensive to the consumer.

If it would be possible to produce hydrous metal oxide sols by a simple manufacturing technique, whereby the finished sol is concentrated, non-viscous, and stable, a valuable contribution to the art would be achieved.

It, therefore, becomes an object of this invention to provide improved hydrous alumina coated silica sols which are of high purity and stability. A further object of the invention is to provide a method of producing hydrous alumina sols which is simple, economical, and results in a new and improved type of hydrous alumina coated silica sol.

THE INVENTION

In accordance with the invention, it has been found that hydrous alumina sols having new and improved chemical and physical characteristics may be prepared by treating hydrophilic colloidal silica sols with trivalent aluminum metal salts. More specifically, a trivalent aluminum metal salt is dissolved into a hydrophilic colloidal silica sol, and then subsequently treated by reaction at elevated temperatures to form a crude mixture of a hydrous alumina coated silica sol. This mixture is then cooled, diluted to approximately 10% by weight, and placed in a stirred ultrafiltration cell which is equipped with an ultrafiltration membrane having a molecular weight cutoff of about 30,000. This crude hydrous alumina coated silica sol mixture is then exposed to ultrafiltration pressures while simultaneously adding distilled water or deionized water at a rate essentially similar to the rate of salt solution removal through the membrane until the salt impurities existing in this crude hydrous alumina coated silica sol mixture are washed from this mixture through the ultrafiltration membrane. Pure distilled water or deionized water is added at a rate comparable to the rate of removal obtained by ultrafiltration through this type of membrane. The product from this ultrafiltration step is a diluted hydrous alumina coated silica gel having a conductance of approximately 2,000–4,000 micromhos and a pH between 4 and 5 pH units. This diluted but reacted product may then be concentrated by known techniques to obtain a concentrated hydrous alumina coated silica sol having at least 30 weight percent solvents and being stable for a long period of time without any signs of gelation or other instabilities, such as precipitation.

To better describe the invention, Applicant would like to present an improved method of producing alumina coated silica sols which comprises:

1. mixing a concentrated deionized silica sol with a concentrated chlorhydrol solution to obtain a premix,
2. heating this premix to at least 90° C. for from 1–15 minutes to form an alumina reacted silica sol solution,
3. cooling this alumina reacted silica sol solution to 180° F. or less to form a cooled alumina reacted silica sol solution,
4. diluting this cooled alumina reacted silica sol solution with D.I. water about 10 weight percent solids to form a diluted alumina reacted silica sol,
5. exposing the diluted alumina reacted silica sol to ultrafiltration through a membrane having a molecular weight cut-off of about 30,000,
6. adding distilled or deionized water to the diluted alumina reacted silica sol during step 5 to wash dissolved salts from said diluted alumina reacted silica sol to form a dilute alumina coated silica sol having a pH from about 4–5 and a conductivity of from 2,000–4,000 micromhos, and
7. concentrating this dilute alumina coated silica sol to at least 30 weight percent solids; thereby obtaining said alumina coated silica sol.

THE STARTING SILICA SOL

A preferred starting silica sol for purposes of the present invention is that denoted as Nalcoag 1034A, a double deionized sol, containing 34% colloidal silica calculated as $SiO_2$. Typically, Nalcoag 1034A contains less than 600 ppm of sodium, $Na^+$, calculated as $Na_2O$, and 180 ppm of chloride, $Cl^-$, as combined chloride and sulphate. In utilizing commercial silica sols, effort was made to start with a relative concentration of $SiO_2$: $Na_2O$ of greater than about 200/1. Table I describes the physical characteristics of the preferred starting silica sol.

TABLE I

| STARTING SILICA SOL CHARACTERISTICS | |
|---|---|
| Nalcoag | 1034A |
| Percent colloidal silica, as $SiO_2$ | 34 |
| pH | 3.1 |
| Average particle size, millimicrons | 16–22 |
| Average surface area, $M^2$/gram | 135–190 |
| Specific gravity at 68° F. | 1.230 |
| Viscosity at 77° F. c.p.s. | 5* |
| $Na_2O$, percent | 0.06* |

*Less than

This starting silica sol is then diluted with either distilled water or deionized (D.I.) water so that the total silica content ranges between 15 and 30 weight percent. It is preferred that the starting silica content be about 25 weight percent prior to the initial reaction with the trivalent aluminum metal salts.

THE TRIVALENT ACIDIC ALUMINUM SALT

The trivalent acidic aluminum salt may be chosen from the group consisting of the aluminum halides and chlorhydrol. The preferred acidic metallic salt is chosen from the group consisting of aluminum trichloride and chlorhydrol. Chlorhydrol is a dichloro aluminum hydroxide which often exists in an aqueous solution. The most preferred trivalent acidic metal salt is chlorhydrol which is present in an aqueous solution which contains approximately 25 weight percent of the chlorhydrol, i.e., aluminum hydroxy dichloride, salt.

THE CHEMICAL REACTION TO FORM COATED SILICA SOLS

The reactions used to form the metal oxide coated silica sols are those taught in U.S. Pat. No. 3,864,142, which is incorporated herein by reference. In this patent, concentrated deionized silica sols are admixed with acidic metallic chlorides or with aluminum hydroxy chlorides, heated for a period of from 1 to 15 minutes, cooled to a temperature of 180° F. or below, diluted with deionized water or distilled water to approximately 10 weight percent solids and then exposed to weak base ion exchange resins to remove contaminating ions.

In my new process, our crude alumina coated silica sols are exposed to ultrafiltration conditions in an ultrafiltration cell equipped with a membrane having a molecular weight cut-off of approximately 30,000.

So as to avoid gelation during this concentration and ion removal process, additional distilled water or deionized water (D.I. $H_2O$) is added to the crude metal oxide reacted silica sols during the ultrafiltration process. This addition of uncontaminated water is necessary to maintain dilution and maintain sol concentration during ultrafiltration, which process is removing from the crude solution both water and dissolved salts including the chloride salts. The ultrafiltration process is continued with the addition of pure water until the pH of the coated sol solution is between 4 and 5 pH units and the conductance of the coated silica sol solution is between 2,000 and 4,000 micromhos.

As soon as the pH and conductivity conditions above are obtained, the silica sol which has now been coated with alumina may be conveniently concentrated by continuing the ultrafiltration without addition of water. However, concentration of the diluted coated silica sol may be achieved by any other known concentrating method.

The final concentrated alumina coated silica sol obtained by the above procedure normally contains at least 30% by weight solids which are preponderantly the alumina coated silica sol. This final concentrated alumina coated silica sol is stable to gelation, whereas, the original mixture which comprises the concentrated deionized silica sol admixed with a concentrated acidic metal salt in the premix shows signs of deterioration and gelation within 24 hours or less.

EXAMPLES

Example 1

About 105.7 pounds of a deionized silica sol containing 25.5 weight percent silica and having a particle size of from 15 to 25 millimicrons, a pH of 3.1, and a surface area of about 150 $m^2$ per gram, was reacted with about 25.4 pounds of a 24.9% chlorhydrol (aluminum hydroxy chloride) solution to form 132.1 pounds of a crude aluminum coated silica sol. This 132.1 pounds of the mixture of 25.5% (by weight) silica sol and 24.9% aluminum hydroxy chloride was heated to 90° C. and held at that temperature for approximately 15 minutes to complete the initial alumina coating of this silica sol. After this reaction time, the resulting reacted silica sol solution was cooled to about 170°–180° F. and diluted with 199.9 pounds of D.I. water to approximately 10% solids.

About 332 pounds of this 10% heat-treated crude sol mixture (specific gravity equal 1.071) was then added to an ultrafiltration cell. During the removal of contaminating chloride salts and other salts, D.I. water was added to maintain the solids level at about 10 weight percent. Table II gives the ultrafiltration results with time.

TABLE II*

| Time | Concentrate pH | Concentrate Cond** | Permeate Cond** | SG | Flux |
|---|---|---|---|---|---|
| 0 hrs. | 4.35 | 5400 | 5000 | 1.071 | 680 ml/min. |
| 2 hrs. | 4.4 | 4800 | 4000 | | |
| 4 hrs. | — | 4800 | 2500 | | |
| 6 hrs. | — | 4200 | 1850 | | |
| 8 hrs. | — | 3500 | 1400 | | |
| 10 hrs. | — | 3100 | 1100 | | |
| 12 hrs. | — | 2700 | 1000 | | |
| 14 hrs. | — | 2300 | 850 | | |
| 16 hrs. | — | 2000 | 730 | | |
| 18 hrs. | 4.95 | 1700 | 720 | | |
| 20 hrs. | 4.85 | 1500 | — | 1.057*** | 860 ml/min. |

*Initial Flux Rate - 680 ml/min./2 ft.$^2$
**micromhos
***Equipment malfunction; partial loss of product Table III outlines the ultrafiltration concentration of the diluted alumina coated silica sol. As can be seen, the conductivity of the diluted alumina coated silica sol was initially approximately 1,500 micromhos. The final conductivity was approximately 3,600 micromhos. Also in Table III the initial pH is observed to be approximately 4.85 and the final pH observed to be 4.55. Additionally, the specific gravity of the diluted deionized alumina coated silica sol is observed to be 1.057, whereas, the final specific gravity is observed to be 1.234 which corresponds to a solids content of approximately 30 weight percent.

TABLE III

| | Concentration Study | | | | |
|---|---|---|---|---|---|
| | Concentrate | | Permeate | Flux Rate | |
| Time | Cond* | pH | Cond* | (ml/min./2 ft.$^2$) | SG |
| 0 hrs. | 1500 | 4.85 | — | 860 | 1.057 |
| 1 hr. | 1950 | 4.85 | — | 785 | 1.085 |
| 2 hrs. | 2700 | 4.70 | 930 | 550 | 1.135 |
| 3 hrs. | 3100 | 4.75 | 1250 | 180 | 1.205 |
| 3 hrs., 40 min. | 3600 | 4.55 | 1250 | ~50 | 1.234 |

*micromhos

The product obtained from the above mentioned procedure exhibits properties of an alumina coated silica sol prepared by using anion exchange techniques taught in U.S. Pat. No. 3,864,142 which has been incorporated herein by reference.

Having described my invention, I claim:

1. A method of producing alumina coated silica sols which comprises:
   A. Mixing a concentrated deionized silica sol with a concentrated solution of trivalent acidic aluminum salts to obtain a premix,
   B. Heating this premix to at least 90° C. for from 1 to 15 minutes to form an alumina reacted silica sol solution,
   C. Cooling this alumina reacted silica sol solution to at least 180° F. to form a cooled alumina reacted silica sol solution,
   D. Diluting this cooled alumina reacted silica sol solution with deionized water to about 10 weight percent solids to form a diluted alumina reacted silica sol,
   E. Exposing the diluted alumina reacted silica sol to ultrafiltration through a membrane having a molecular weight cutoff of about 30,000, and
   F. Adding distilled or deionized water to the diluted alumina reacted silica sol during step E to wash dissolved salts from said diluted alumina reacted silica sol to form a dilute alumina coated silica sol having a pH from about 4-5 and a conductivity of from 2000-4000 micromhos, and
   G. Concentrating this dilute alumina coated silica sol to at least 30 weight percent solids,
   thereby obtaining said alumina coated silica sols.

2. The method of claim 1 wherein the concentrated deionized silica sol contains 25.5 weight percent silica, has a pH of 3.0±0.3 units, has a particle size between 15 and 25 millimicrons, and a surface area of about 150 m$^2$ per gram.

3. The method of claim 2 wherein the concentrated solution of trivalent acidic aluminum salts contains about 25 weight percent aluminum hydroxy dichloride.

4. The alumina coated silica sol synthesized by the method of claim 1.

5. The alumina coated silica sol synthesized by the method of claims 2 or 3.

* * * * *